United States Patent
Choi et al.

(10) Patent No.: US 9,409,562 B2
(45) Date of Patent: Aug. 9, 2016

(54) TORQUE ASSIST SYSTEM AND AUTOMATED MANUAL TRANSMISSION UTILIZING THE SAME

(71) Applicant: HYUNDAI WIA CORPORATION, Gyeongsangnam-do (KR)

(72) Inventors: Min Sik Choi, Gyeonggi-do (KR); Jae Sik Park, Gyeonggi-do (KR); Jae Woon Shin, Gyeonggi-do (KR)

(73) Assignee: HYUNDAI WIA CORPORATION, Gyeongsangnam-do (KR)

( * ) Notice: Subject to any disclaimer, the term of this patent is extended or adjusted under 35 U.S.C. 154(b) by 29 days.

(21) Appl. No.: 14/138,537

(22) Filed: Dec. 23, 2013

(65) Prior Publication Data

US 2014/0187380 A1    Jul. 3, 2014

(30) Foreign Application Priority Data

Dec. 28, 2012  (KR) .................. 10-2012-0156091

(51) Int. Cl.
| | |
|---|---|
| *F16H 3/04* | (2006.01) |
| *F16H 3/38* | (2006.01) |
| *B60W 10/11* | (2012.01) |
| *B60W 10/02* | (2006.01) |
| *B60W 10/06* | (2006.01) |
| *F16H 3/00* | (2006.01) |
| *F16H 3/093* | (2006.01) |
| *F16H 61/04* | (2006.01) |

(52) U.S. Cl.
CPC .............. *B60W 10/11* (2013.01); *B60W 10/02* (2013.01); *B60W 10/06* (2013.01); *F16H 3/006* (2013.01); *F16H 3/093* (2013.01); *F16H 61/04* (2013.01); *B60Y 2400/71* (2013.01); *F16H 2003/0931* (2013.01); *F16H 2061/0425* (2013.01); *F16H 2061/0429* (2013.01); *F16H 2200/0052* (2013.01); *Y10T 477/6403* (2015.01)

(58) Field of Classification Search
CPC ................ F16H 2061/0429; F16H 2061/0425; B60Y 2400/71
See application file for complete search history.

(56) References Cited

U.S. PATENT DOCUMENTS

| | | | | |
|---|---|---|---|---|
| 7,114,409 | B2 * | 10/2006 | Eggert et al. ................. | 74/331 |
| 7,210,367 | B2 * | 5/2007 | Akutagawa ................... | 74/340 |
| 2007/0265126 | A1 * | 11/2007 | Janson et al. ................. | 475/5 |
| 2010/0081536 | A1 * | 4/2010 | Braford, Jr. .................. | 475/303 |
| 2011/0300983 | A1 * | 12/2011 | Kurokawa ...................... | 475/5 |
| 2012/0065014 | A1 * | 3/2012 | Puiu et al. ..................... | 475/5 |
| 2012/0065016 | A1 * | 3/2012 | Tamai et al. ................... | 475/5 |

FOREIGN PATENT DOCUMENTS

| | | |
|---|---|---|
| JP | 2005-207487 | 8/2005 |
| JP | 2006-132755 | 5/2006 |
| JP | 2011-020507 | 2/2011 |
| KR | 10-2012-0072994 | 7/2012 |

* cited by examiner

*Primary Examiner* — Ramya Burgess
*Assistant Examiner* — Lillian Nguyen (57) ABSTRACT

The torque assist system of the present invention includes a torque assist shaft having a first terminating part connected to the input shaft, an outer shaft and an inner shaft rotating independently from the outer shaft; a planetary gear set mounted on the inner shaft exposed to a second terminating part of the torque assist shaft; a clutch being disposed adjacent to the planetary gear set and operated by an external force; and an input gear mounted on the exposed inner shaft of the torque assist shaft and connected to the planetary gear set by the clutch to transmit power to an output gear mounted on the output shaft of the vehicle transmission.

12 Claims, 8 Drawing Sheets

TORQUE ASSIST SYSTEM AND AUTOMATED MANUAL TRANSMISSION UTILIZING THE SAME

CROSS-REFERENCE TO RELATED APPLICATION

This application claims priority to and the benefit of Korean Patent Application No. 10-2012-0156091 filed on Dec. 28, 2012, which is herein incorporated by reference in its entirety.

BACKGROUND OF THE INVENTION

1. Field of the Invention

The present invention relates to a torque assist system, and more particularly, to a torque assist system which can continuously transmit a torque during shifting gears, and an automated manual transmission utilizing the same.

2. Description of the Related Art

While the torque generated from an engine of a vehicle is nearly constant irrespective of a change in the rotational speed, the output greatly varies according to the rotational speed. The driving force required when a vehicle travels considerably changes according to the road condition and vehicle traveling speed. To cope with the considerably changing driving force, a transmission for changing the torque between the engine and wheels is required.

The transmission may be largely classified into a manual transmission, an automatic transmission and an automated manual transmission.

The manual transmission is a gear shifting device in which a driver manually shifts gears. During shifting, a connection between a transmission actuator and an engine is released by a clutch, gears are then manipulated to adjust the gear position, and power is transmitted back to the clutch. Due to the complicated shifting process, the manual transmission has a disadvantage in that it is difficult for an inexperienced driver to operate the manual transmission. However, a driver who wants a quick response and high fuel efficiency tend to prefer a vehicle equipped with the manual transmission to a vehicle equipped with an automatic transmission because of their adeptness in making use of engine functionality.

The automatic transmission is a device for automatically shifting gears, and a torque converter controls power supply and increases torque by the flow of fluids. The automatic transmission automatically changes shift stages using a predetermined shifting pattern according to the pedaling degree of an accelerator pedal and the traveling speed of the vehicle, and a shifting process is performed by a hydraulic pressure device.

Recently, in order to overcome the disadvantages of the automatic transmission, there has been developed a continuously variable transmission (CVT) for achieving smooth acceleration without a shifting shock using a belt and a pulley. In addition, in order to overcome disadvantages of the manual transmission, a semi automatic transmission (SAT) and an automated manual transmission (AMT) have been developed. The SAT does not require a clutch pedal. That is to say, even if shifting in the SAT is manually manipulated by a driver, it is not necessary for the driver to manipulate a clutch during shifting. In the AMT, both a clutch and a shift lever are automatically manipulated in a manual transmission.

In particular, since the clutch and the shift lever are automatically controlled by a hydraulic pressure controller while still using the manual transmission, the automated manual transmission can provide an advantage exerted in the manual transmission in view of fuel efficiency and convenience of the automatic transmission. A typical exemplary automated manual transmission is an automated manual transmission having an electronic actuator and a dry type single-plate clutch mounted therein.

However, one of the serious problems of the automated manual transmission is a shifting delay due to the interruption of the torque transmission when shifting, that is, when the clutch is off. The shifting delay causes judder vibrations to a vehicle, providing passengers including the driver of the vehicle, with a disagreeable shift feeling.

SUMMARY OF THE INVENTION

In order to overcome the above-mentioned shortcomings, the present invention provides a torque assist system, which can attain a smooth shift feeling by suppressing a shifting delay, and an automated manual transmission using the same.

According to an aspect of the invention, there is provided a torque assist system mounted on an input shaft of a vehicle transmission, the torque assist system including a torque assist shaft having a first terminating part connected to the input shaft, an outer shaft and an inner shaft which rotates independently from the outer shaft, a portion of the inner shaft being extended out of the outer shaft; a planetary gear set mounted on the inner shaft exposed to a second terminating part of the torque assist shaft, a clutch disposed to be adjacent to the planetary gear set and operating by an external force, and an input gear mounted on the exposed inner shaft of the torque assist shaft and connected to the planetary gear set by the clutch to transmit power to an output gear mounted on the output shaft of the vehicle transmission.

In this above structure, even in a state in which the outer shaft does not rotate during shifting, the inner shaft rotates to transmit a driving force to the output shaft through the planetary gear set and the input gear.

The outer shaft of the torque assist shaft may have a hollow cylindrical shape and may be coupled to the outer shaft of the input shaft to interrupt power transmission from the engine during shifting, and the inner shaft may have a hollow cylindrical shape and may be coupled to the inner shaft of the input shaft to receive power transmitted from the engine even during shifting.

A needle roller bearing may be mounted between the outer shaft and the inner shaft of the torque assist shaft to allow the inner shaft to rotate, irrespective of rotation of the outer shaft. The extending part inner shaft of the torque assist shaft and the input gear may be connected to each other by spline engagement.

The planetary gear set constituting the torque assist system may include a sun gear spline-engaged with the extending part of the inner shaft of the torque assist shaft, a planetary gear disposed around the sun gear, a ring gear disposed outside the planetary gear, and a carrier, the input gear is spline-engaged with the carrier of the planetary gear set, and the clutch is mounted on the outer circumferential part of the ring gear.

The torque assist system may further include a hydraulic system installed to be adjacent to the clutch and including a piston, a bearing and a pressure plate to supply a hydraulic pressure to the clutch.

According to another aspect of the invention, there is provided an automated manual transmission including an input shaft having a first terminating part connected to a driving shaft of an engine, a transmission gear part mounted around the input shaft and adjusting a driving force by a clutch system, a torque assist system connected to a second terminating part of the input shaft, and an output shaft disposed to be parallel to the input shaft, receiving transmission adjusted power from the input shaft during traveling and receiving power from the torque assist system during shifting.

The input shaft may include an outer shaft having a hollow cylindrical shape and a cylindrical inner shaft disposed within the outer shaft, the outer shaft and a first terminating part of the inner shaft may be connected to the driving shaft of the engine, power transmission from the input shaft is controlled by a clutch system, power transmission to the inner shaft may be continuously maintained, and the driving force transmitted to the inner shaft during shifting may be transmitted to the torque assist system.

The torque assist system constituting the automated manual transmission may include a torque assist shaft having a first terminating part connected to the input shaft, an outer shaft connected to the outer shaft of the input shaft and an inner shaft connected to the inner shaft of the input shaft rotating independently from the outer shaft in a state in which a portion of the inner shaft extends to the outside of the outer shaft, a planetary gear set mounted on the inner shaft exposed to a second terminating part of the torque assist shaft, a clutch disposed to be adjacent to the planetary gear set and operating by an external force, and an input gear mounted on the exposed inner shaft of the torque assist shaft and connected to the planetary gear set by the clutch to transmit power to an output gear mounted on the output shaft of the vehicle transmission, wherein even in a state in which the outer shaft does not rotate during shifting, the inner shaft rotates to transmit a driving force to the output shaft through the planetary gear set and the input gear.

The outer shaft of the torque assist shaft may be shaped of a hollow cylinder and may be coupled to the outer shaft of the input shaft to interrupt power transmission from the engine during shifting, and the inner shaft may be shaped of a hollow cylinder and may be coupled to the inner shaft of the input shaft to receive power transmitted from the engine even during shifting.

A needle roller bearing may be mounted between the outer shaft and the inner shaft of the torque assist shaft to allow the inner shaft to rotate and a needle roller bearing may be mounted between the outer shaft and the inner shaft of the input shaft to allow the inner shaft to rotate, irrespective of rotation of the outer shaft.

The extending part of the inner shaft of the torque assist shaft and the input gear may be connected to each other by spline engagement.

The planetary gear set may include a sun gear spline-engaged with the extending part of the inner shaft of the torque assist shaft, a planetary gear disposed around the sun gear, a ring gear disposed outside the planetary gear, and a carrier, the input gear is spline-engaged with the carrier of the planetary gear set, and the clutch is mounted on the outer circumferential part of the ring gear.

The torque assist system may be installed to be adjacent to the clutch and includes a piston, a bearing and a pressure plate to supply a hydraulic pressure to the clutch.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present disclosure will be described in detail with reference to the accompanying drawings in such a manner that the technical idea of the present disclosure may easily be carried out by a person with ordinary skill in the art to which the invention pertains. Objects, operations, effects, other objects, characteristics and advantages of the present disclosure will be easily understood from an explanation of a preferred embodiment that will be described in detail below by reference to the attached drawings.

Although embodiments have been described with reference to illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

Hereinafter, configurations and functions of a torque assist system according to a preferred embodiment of the present invention and an automated manual transmission including the torque assist system will be described in detail with reference to the accompanying drawings.

In the following description, detailed descriptions of components well known in the related art, such as a transmission gear part, a clutch system, a planetary gear set, a needle roller bearing, or a differential gear part, will be omitted.

Figure 1:
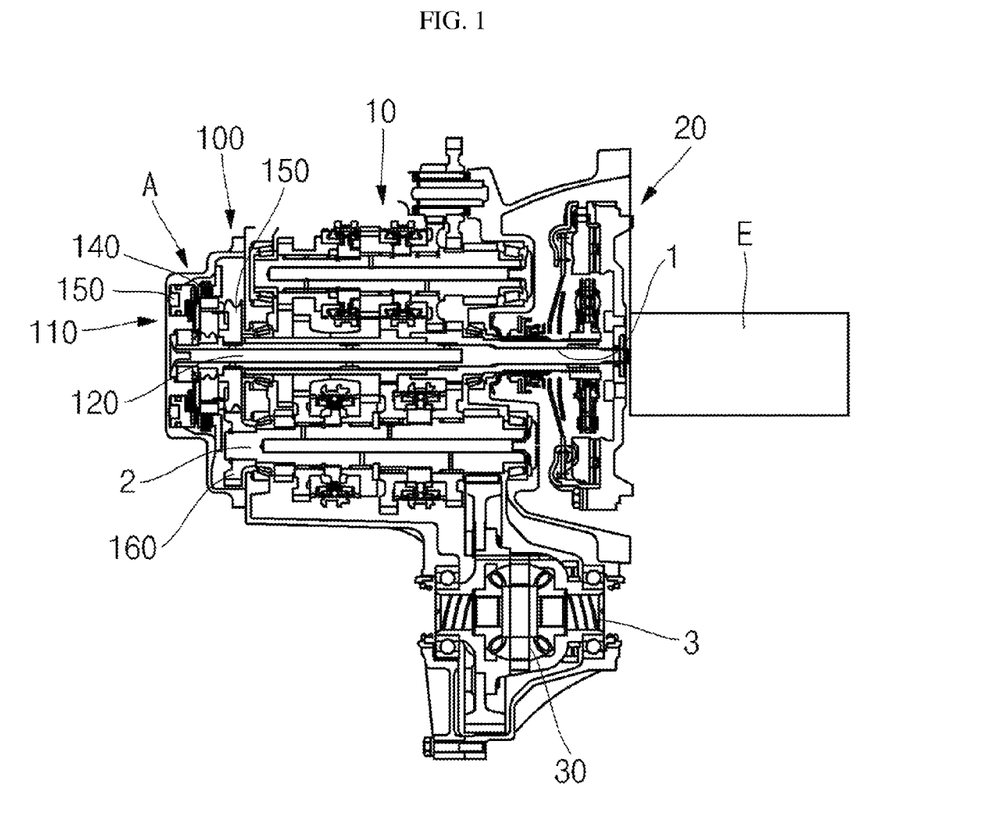
FIG. 1 a view illustrating the overall configuration of an automated manual transmission including a torque assist system according to the present invention.
Figure 2:
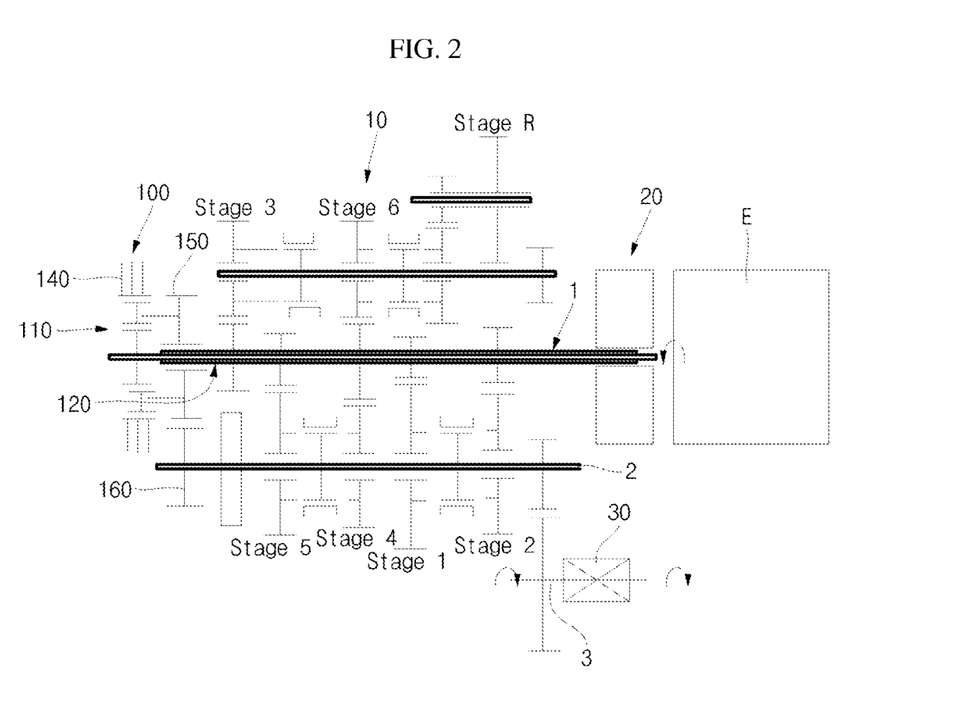
FIG. 2 is a schematic view illustrating the automated manual transmission shown in FIG. 1.

FIG. 1 illustrates the overall configuration of an automated manual transmission including a torque assist system according to the present invention and FIG. 2 is a schematic view illustrating the automated manual transmission shown in FIG. 1.

The automated manual transmission according to the present invention includes an input shaft 1 connected to a driving shaft of the engine E, a transmission gear part 10 mounted around the input shaft 1, a clutch system 20 disposed between the transmission gear part 10 and the engine E, and an output shaft disposed to be parallel to the input shaft 1 and receiving shift-adjusted power.

Here, the output shaft is connected to an axel 3, and the shift-adjusted power is transmitted to wheels (not shown) through a differential gear part 30 mounted on the axel 3. Meanwhile, in the illustrated embodiment, the transmission gear part 10 includes first to sixth stages and a reverse range, but the present invention does not limit the structure of the transmission gear part 10 to that illustrated herein.

Meanwhile, the configurations and functions of the transmission gear part 10 and the clutch system 20 are substantially the same as those of a transmission gear part and a clutch system employed to an automatic transmission, and detailed descriptions thereof will be omitted.

As illustrated in FIGS. 1 and 2, the torque assist system 100 according to the present invention is mounted on a second terminating part of the input shaft 1 (a terminating part opposite to the first terminating part connected to the driving shaft of the engine E.

Figure 3:
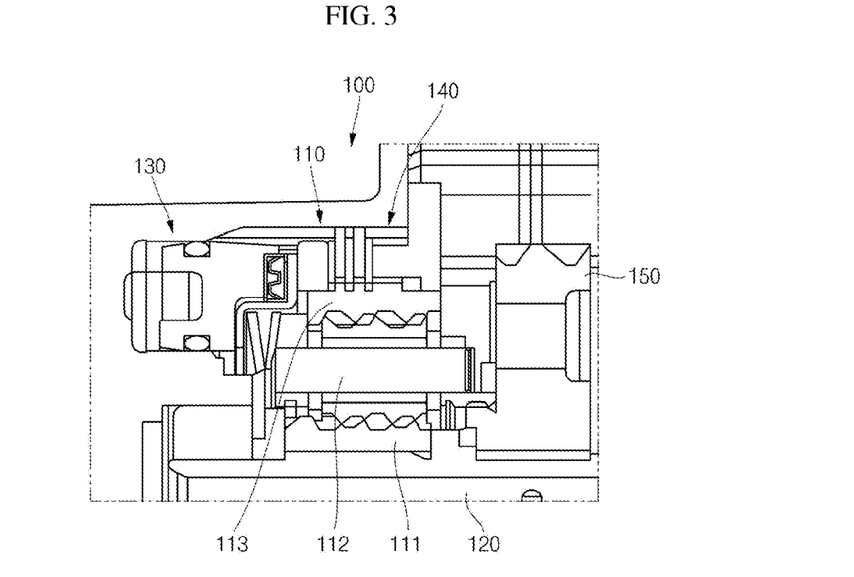
FIG. 3 is a detailed view of a portion "A" of FIG. 1, illustrating the torque assist system.

FIG. 3 is a detailed view of a portion "A" of FIG. 1 and illustrates a structure of the torque assist system 100.

The torque assist system 100 includes a torque assist shaft 120 connected to the input shaft 1, a planetary gear set 110 mounted on the torque assist shaft 120, a hydraulic system 130, a clutch 140 coupled to the planetary gear set 110, and an input gear 150 mounted on the torque assist shaft 120.

Figure 4:
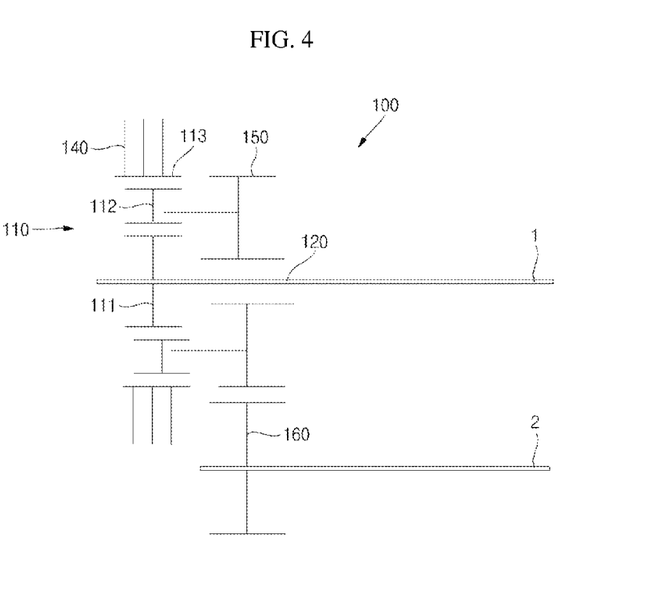
FIG. 4 is a schematic view illustrating a planetary gear set shown in FIG. 3.

FIG. 4 is a schematic view illustrating the planetary gear set 110 shown in FIG. 3.

The torque assist shaft 120 of the torque assist system 100 is connected to the input shaft 1 connected to the driving shaft of the engine E (see FIG. 1), and the planetary gear set 110 is mounted on the torque assist shaft 120 (specifically an inner shaft 122 to be described later).

The planetary gear set 110 includes a sun gear 111 spline-engaged with the torque assist shaft 120, a planetary gear 112 disposed around the sun gear 111, and a ring gear 113 disposed outside the planetary gear 112.

In the meantime, FIG. 4 illustrates the clutch 140 coupled to the planetary gear set 110, the input gear 150 mounted on the torque assist shaft 120 and the output gear 160 mounted on the output shaft.

Here, the clutch 140 may be spline-engaged with the outer circumferential part of the ring gear 113 of the planetary gear set 110, and the input gear 150 may be spline-engaged with the carrier of the planetary gear set 110. In addition, the output gear 160 may be spline-engaged with the output shaft. In particular, a bearing is mounted between the input gear 150 and the torque assist shaft 120, so that the input gear 150 is not restrained by rotation of the torque assist shaft 120.

Figure 5:
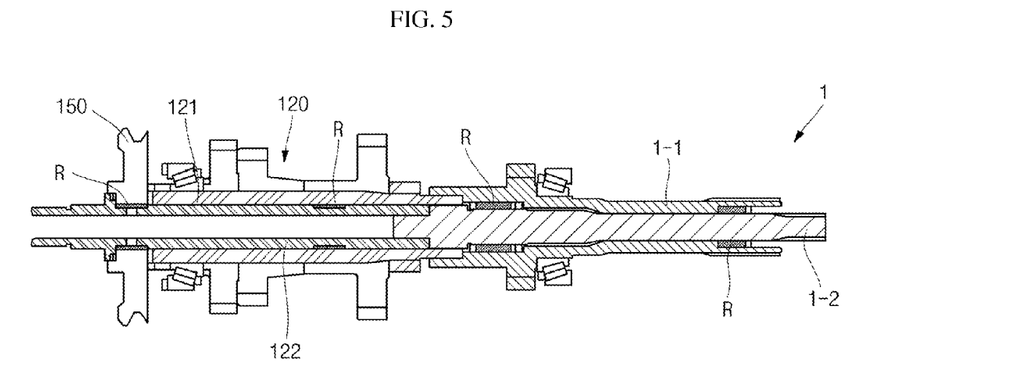
FIG. 5 illustrates the relationship between an input shaft and a torque assist shaft of the torque assist system.

FIG. 5 illustrates the torque assist shaft 120 of the torque assist system 100 together with a relationship between the input shaft 1 and the torque assist shaft 120.

As illustrated in FIG. 5, the input shaft 1 includes a hollow cylindrical outer shaft 1-1 and a cylindrical inner shaft 1-2 disposed in the outer shaft 1-1. Both of first terminating parts of the outer shaft 1-1 and the inner shaft 1-2 are connected to the driving shaft of the engine E, and a plurality of needle roller bearings R are mounted between the inner circumferential surface of the outer shaft 1-1 and the outer circumferential surface of the inner shaft 1-2.

Therefore, the inner shaft 1-2 is not restrained by rotation of the outer shaft 1-1. That is to say, even when power is not transmitted to an outer shaft 1a (corresponding to the transmission gear part 10) by the clutch system 20, the inner shaft 1-2 is continuously rotated.

The torque assist shaft 120 includes an outer shaft 121 having a hollow cylindrical shape and an inner shaft 122 having a cylindrical shape and disposed in the outer shaft 121. A plurality of needle roller bearings R are mounted between the inner circumferential surface of the outer shaft 121 and the outer circumferential surface of the inner shaft 122.

The aforementioned torque assist shaft 120 and the input shaft 1 are coupled to each other by a hot press fit inserting process.

That is to say, the first terminating part (corresponding to the input shaft 1) of the outer shaft 121 of the torque assist shaft 120 extends to the outside of the inner shaft 122, and the extending part is inserted between the inner shaft 1-2 and the outer shaft 1-1 at the second terminating part (corresponding to the torque assist shaft 120) of the input shaft 1. In this state, the hot press fit inserting process is performed on a contact portion between the outer shaft 121 of the torque assist shaft 120 and the outer shaft 1-1 of the input shaft 1, so that the outer shaft 121 of the torque assist shaft 120 is fixedly coupled to the outer shaft 1-1 of the input shaft 1. However, it should be noted that the coupling method is not limited to the above mentioned method.

In addition, the second terminating part of the inner shaft 1-2 of the input shaft 1 extends to the outside of the outer shaft 1-1, and the outer circumferential surface of the extending part makes contact with the inner circumferential surface of the inner shaft 122 at a front end of the torque assist shaft 120. In this state, the hot press fit inserting process is performed, so that the inner shaft 121 of the torque assist shaft 120 is fixedly coupled to the inner shaft 1-1 of the input shaft 1. However, it should be noted that the coupling method is not limited to the above mentioned method.

Meanwhile, as shown in FIG. 5, the inner shaft 122 extends to the outside of the outer shaft 121 at the second terminating part (opposite to the first terminating part) of the torque assist shaft 120, and the input gear 150 is spline-engaged with the extending part. Although not shown, the planetary gear set 110 is mounted on a terminating part of the extending part.

As shown in FIG. 2, most of shift gears of the transmission gear part 10 are mounted on the outer shaft 1-1 of the input shaft 1. However, some shift gears (e.g., 3-stage gears) may be mounted on the outer shaft 121 of the torque assist shaft 120.

Figure 6A:
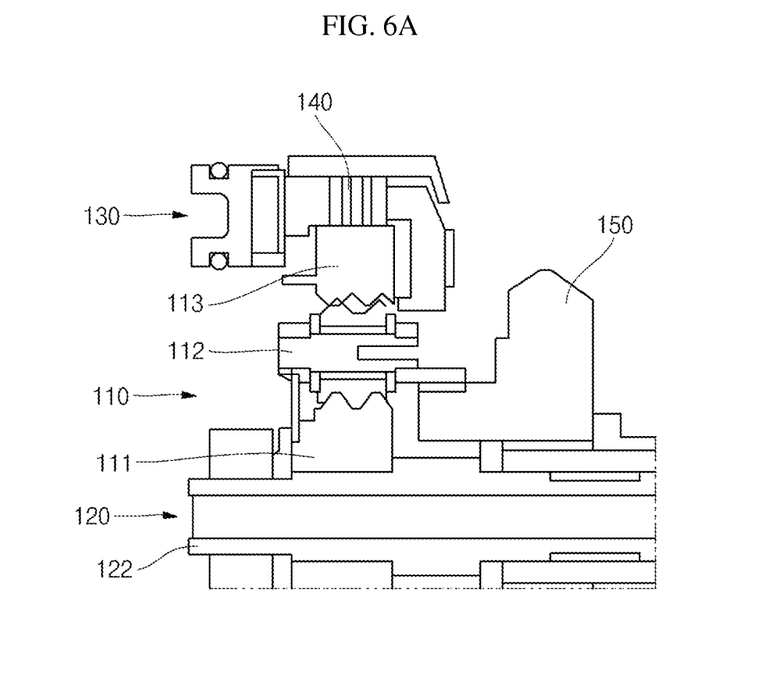
FIG. 6A illustrates a position and an entire structure of the torque assist system shown in FIG. 3.
Figure 6B:
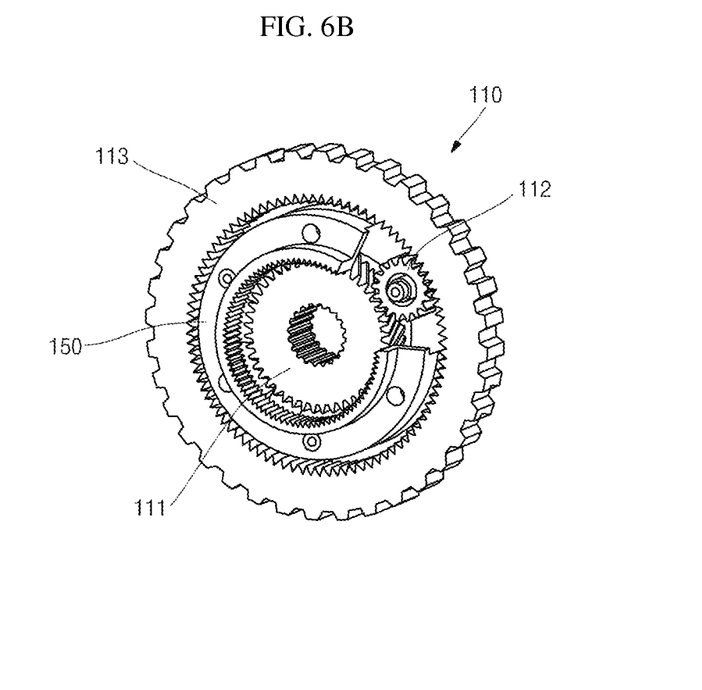
FIG. 6B illustrates a planetary gear set shown in FIG. 3.
Figure 6C:
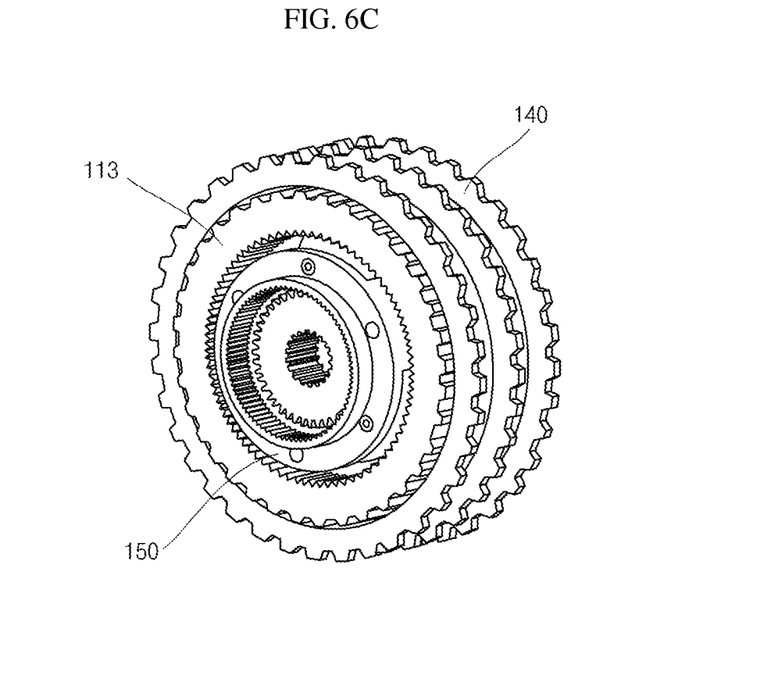
FIG. 6C illustrates a clutch mounted on the planetary gear set shown in FIG. 3.
Figure 6D:
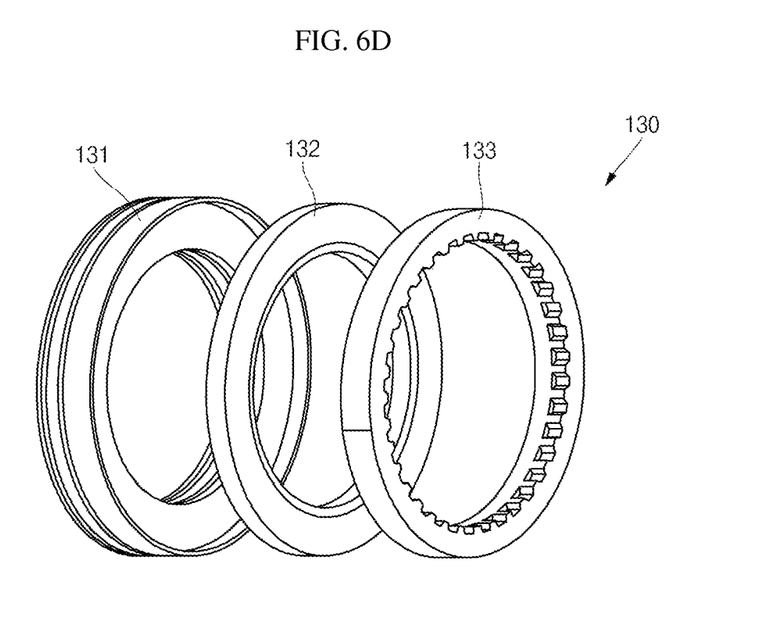
FIG. 6D illustrates a hydraulic system shown in FIG. 3.

FIG. 6A illustrates the entire structure of the torque assist system 100 shown in FIG. 3 including the inner shaft 122 of the torque assist shaft 120, FIG. 6B illustrates the planetary gear set 110, FIG. 6C illustrates a clutch system mounted on the planetary gear set, and FIG. 6D illustrates a hydraulic system.

As described above, the planetary gear set 110 includes a sun gear 111 spline-engaged with the inner shaft 122 of the torque assist shaft 120, a planetary gear 112 disposed around the sun gear 111, and a ring gear 113 disposed outside the planetary gear 112.

The input gear 150 is spline-engaged with a carrier (not shown) of the planetary gear set 110, and the clutch 140 is mounted on the outer circumferential part of the ring gear 112. Meanwhile, the hydraulic system 130 is installed to be adjacent to the clutch and includes a piston 131, a bearing 132 and a pressure plate 133.

Hereinafter, a shifting process of the automated manual transmission including the torque assist system according to the present invention will be described.

Figure 7:
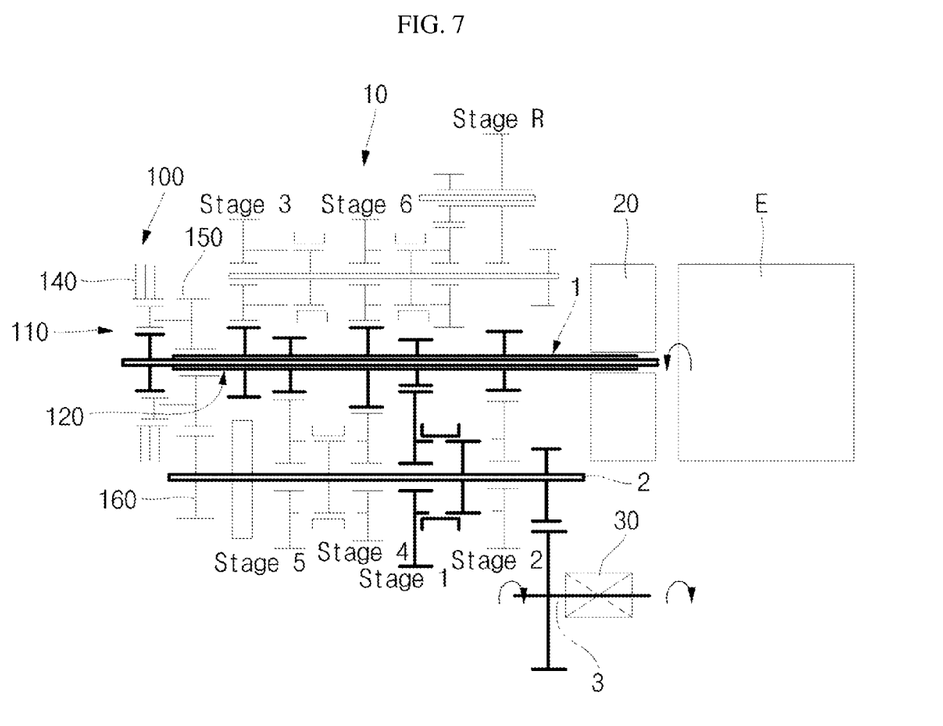
FIG. 7 illustrates the automated manual transmission according to the present invention in a state in which a vehicle travels in a first stage.
Figure 8:
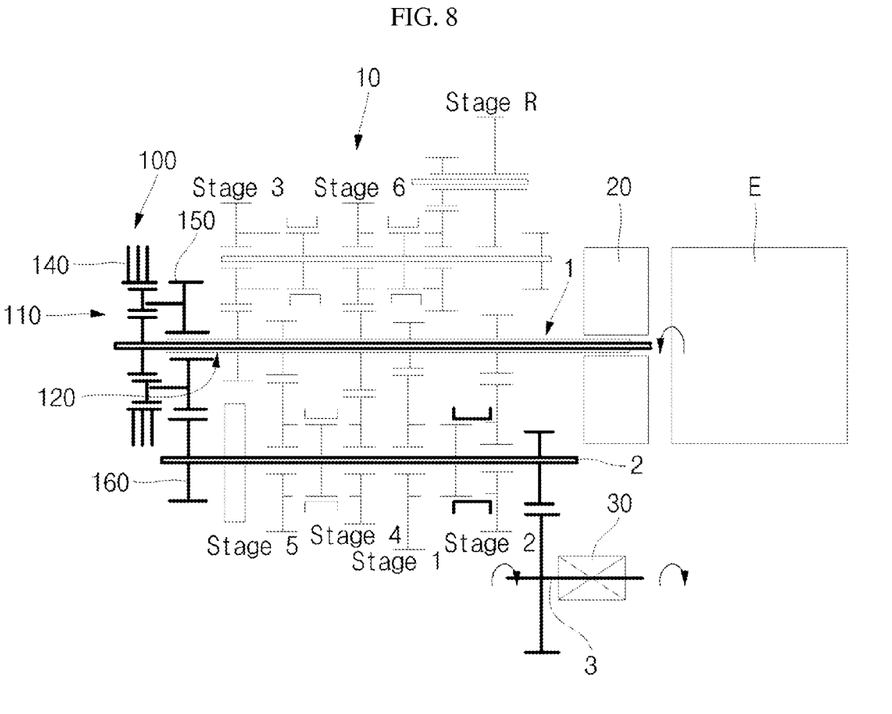
FIG. 8 illustrates the automated manual transmission according to the present invention in a shifting process from a first stage to a second stage.
Figure 9:
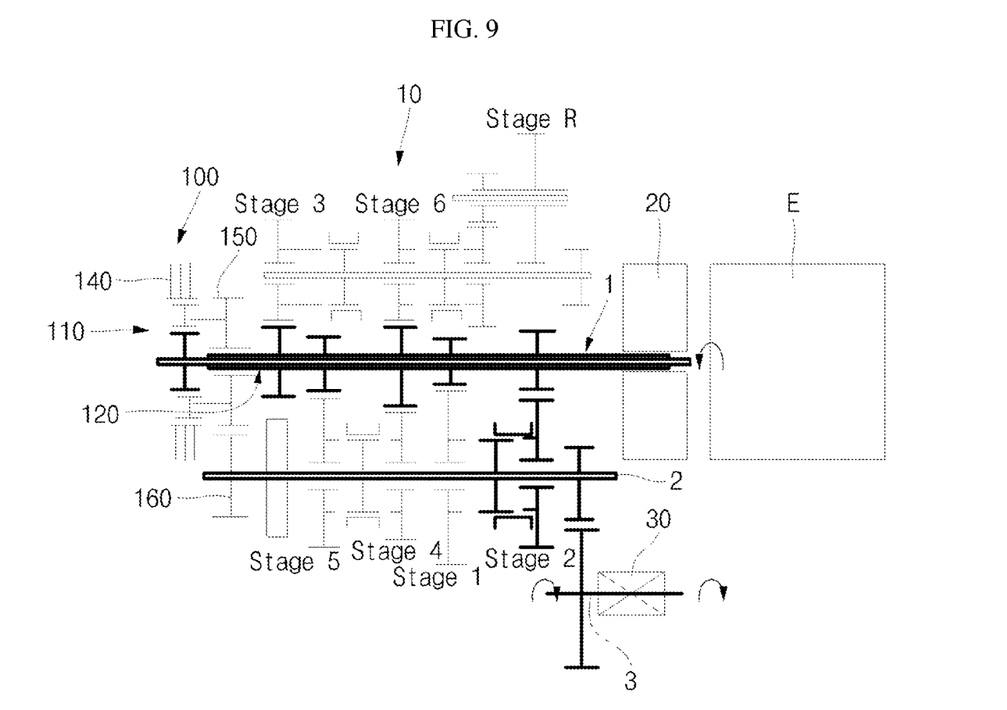
FIG. 9 illustrates the automated manual transmission according to the present invention in a state in which a vehicle travels in a second stage.

FIG. 7 illustrates the automated manual transmission according to the present invention in a state in which a vehicle travels in a first stage, FIG. 8 illustrates the automated manual transmission according to the present invention in a shifting process from a first stage to a second stage, and FIG. 9 illustrates the automated manual transmission according to the present invention in a state in which a vehicle travels in a second stage.

FIGS. 7 to 9 illustrate a state in which the input shaft continuously rotates. In FIGS. 7 to 9, for the convenience's sake, components to which power is transmitted (that is, rotate) are indicated by thick lines, and components to which power is not transmitted are indicated by thin lines.

First Stage Traveling

As the engine E of a vehicle operates, the outer shaft 1-2 and the inner shaft 1-2 of the input shaft 1 independently rotate, and the outer shaft 121 of the torque assist shaft 120 connected to the input shaft 1 and the inner shaft 122 also rotate.

While the vehicle travels in the first stage, that is, when the clutch system 20 is ON, the power of the engine E is transmitted to wheels of the vehicle through the input shaft 1, a dual mass flywheel (not shown), a first stage gear, an output shaft and a differential gear part 30, which is the same power transmission state as the general manual transmission.

During the first stage traveling of the vehicle, the torque assist system 100 does not operate, which will now be described in more detail.

First, the power of the engine E is transmitted to the torque assist shaft 120 of the torque assist system 100 through the input shaft 1, and the outer shaft 121 and the inner shaft 122 rotate and the sun gear 111, the planetary gear 112 and the ring gear 113 of the planetary gear set 100 rotate, respectively.

Meanwhile, when the hydraulic system 130 does not operate, the clutch 140 does not operate. Therefore, the clutch 140 is separated from the ring gear 113 of the planetary gear set 110. As a result, the ring gear 113 of the planetary gear set 110 idles, and the power is not transmitted to the input gear 150.

As described above, needle roller bearings R are disposed between the input gear 150 and the outer shaft 121 of the torque assist shaft 120, and the power transmission to the output shaft through the torque assist system 100 does not occur.

Shifting from First Stage to Second Stage

According to the traveling condition of a vehicle, an electronic control unit (not shown) shifts a transmission mode from a first stage to a second stage. To this end, the electronic control unit turns OFF the clutch system 20 to interrupt power supply from the engine E to the input shaft 1, that is, the outer shaft 1-1.

Meanwhile, the power transmission from the engine E to the inner shaft 1-2 of the input shaft 1 is continuously performed. Therefore, the outer shaft 121 of the torque assist shaft 120 of the torque assist system 100 does not rotate while the inner shaft 122 continuously rotates. Here, the respective gears of the planetary gear set 110 mounted on the inner shaft 122 also rotate.

Concurrently, the electronic control unit is actuated by a select actuator and a shift actuator of a transmission system (not shown), thereby selecting a second stage gear of the transmission gear part 10 to be connected to the input shaft 1 (specifically to the outer shaft 1-1).

Additionally, the electronic control unit actuates the torque assist system 100. That is to say, the hydraulic system 130 is actuated to connect the ring gear 113 of the planetary gear set 110 and the input gear 150 through the clutch 140.

Consequently, the rotational force of the inner shaft 122 of the torque assist shaft 120 is transmitted to the output shaft 2 through the input gear 150 and the output gear 160 mounted on the output shaft 2.

That is to say, even when the outer shaft 1-1 of the input shaft 1 and the outer shaft 121 of the torque assist shaft 120 do not rotate for shifting, the driving force of the engine E is continuously transmitted to the output shaft through the inner shaft 1-2 of the input shaft 1, the inner shaft 122 of the torque assist shaft 120, the planetary gear set 110, the input gear 150 and the output gear 160 to operate wheels of the vehicle As described above, since the driving force of the engine E is transmitted to the output shaft even during shifting, the torque can be continuously transmitted in the shifting process, and shifting delay due to an interruption to the torque and judder vibrations are not caused.

Second Stage Traveling

While the vehicle travels in a second stage after the shifting process, that is, when the clutch system 20 is ON, the power of the engine E is transmitted to wheels of the vehicle through the input shaft 1, the dual mass flywheel, the second stage gear, the output shaft and the differential gear part 30.

During the second stage traveling of the vehicle, the torque assist system 100 does not operate, which is the same as above with regard to the first stage traveling.

Meanwhile, the operation of the torque assist system 110 in third to sixth stage shifting processes is the same as described above. Since a reverse shifting process is typically performed when the vehicle stops, the aforementioned shifting process is not applied to the aforementioned shifting processes.

As described above, in the automated manual transmission including a torque assist system according to the invention, for the purpose of shifting, even when the outer shaft of the input shaft and the outer shaft of the torque assist shaft do not rotate, the driving force of an engine is continuously transmitted to the output shaft through the inner shaft of the input shaft, the inner shaft of the torque assist shaft, the planetary gear set, the input gear and the output gear, thereby operating wheels of the vehicle.

Since the driving force of the engine is continuously transmitted to the output shaft in the above-described manner when shifting, the interruption of the torque transmission does not occur during shifting, and the shifting delay due to the torque interruption and judder vibrations of the vehicle are not caused, thereby providing passengers with a smooth shift feeling.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A torque assist system mounted on an input shaft of a vehicle transmission, comprising:
    a transmission gear part mounted around the input shaft;
    a clutch system disposed between the transmission gear part and an engine of a vehicle;
    a torque assist shaft connected to the input shaft through a first terminating part thereof, the torque assist shaft including an outer shaft and an inner shaft which rotates independently from the outer shaft, a portion of the inner shaft being extended out of the outer shaft;
    a planetary gear set mounted on the inner shaft exposed to a second terminating part of the torque assist shaft;
    a clutch coupled to the planetary gear set and operated by an external force; and
    an input gear mounted on the exposed inner shaft of the torque assist shaft and connected to the planetary gear set by the clutch to transmit power to an output gear mounted on an output shaft of the vehicle transmission,
    wherein even in a state in which the outer shaft does not rotate during shifting, the inner shaft rotates to transmit a driving force to the output shaft through the planetary gear set and the input gear.

2. The torque assist system of claim 1, wherein the outer shaft of the torque assist shaft has a hollow cylindrical shape and is coupled to the outer shaft of the input shaft to interrupt power transmission from the engine during shifting, and the inner shaft of the torque assist shaft has a hollow cylindrical shape and is coupled to the inner shaft of the input shaft to receive power transmitted from the engine even during shifting.

3. The torque assist system of claim 2, wherein a needle roller bearing is mounted between the outer shaft and the inner shaft of the torque assist shaft to allow the inner shaft to rotate, irrespective of rotation of the outer shaft.

4. The torque assist system of claim 2, wherein the extending part inner shaft of the torque assist shaft and the input gear are connected to each other by spline engagement.

5. The torque assist system of claim 1, wherein the planetary gear set includes a sun gear spline-engaged with the extending part of the inner shaft of the torque assist shaft, a planetary gear disposed around the sun gear, a ring gear disposed outside the planetary gear, and a carrier, the input gear is spline-engaged with the carrier of the planetary gear set, and the clutch is mounted on the outer circumferential part of the ring gear.

6. The torque assist system of claim 5, further comprising a hydraulic system installed to be adjacent to the clutch and including a piston, a bearing and a pressure plate to supply a hydraulic pressure to the clutch.

7. A torque assist system mounted on an input shaft of a vehicle transmission, comprising:
    a transmission gear part mounted around the input shaft;
    a clutch system disposed between the transmission gear part and an engine of a vehicle;
    a torque assist shaft connected to the input shaft through a first terminating part thereof, the torque assist shaft including an outer shaft and an inner shaft which rotates independently from the outer shaft, a portion of the inner shaft being extended out of the outer shaft;
    a planetary gear set mounted on the inner shaft exposed to a second terminating part of the torque assist shaft;
    a clutch coupled to the planetary gear set and operated by an external force; and
    an input gear mounted on the exposed inner shaft of the torque assist shaft and connected to the planetary gear set by the clutch to transmit power to an output gear mounted on an output shaft of the vehicle transmission.

8. The torque assist system of claim 7, wherein the outer shaft of the torque assist shaft has a hollow cylindrical shape and is coupled to the outer shaft of the input shaft to interrupt power transmission from the engine during shifting, and the inner shaft has a hollow cylindrical shape and is coupled to the inner shaft of the input shaft to receive power transmitted from the engine even during shifting.

9. The torque assist system of claim 8, wherein a needle roller bearing is mounted between the outer shaft and the inner shaft of the torque assist shaft to allow the inner shaft to rotate, irrespective of rotation of the outer shaft.

10. The torque assist system of claim 8, wherein the extending part inner shaft of the torque assist shaft and the input gear are connected to each other by spline engagement.

11. The torque assist system of claim 7, wherein the planetary gear set includes a sun gear spline-engaged with the extending part of the inner shaft of the torque assist shaft, a planetary gear disposed around the sun gear, a ring gear disposed outside the planetary gear, and a carrier, the input gear is spline-engaged with the carrier of the planetary gear set, and the clutch is mounted on the outer circumferential part of the ring gear.

12. The torque assist system of claim 11, further comprising a hydraulic system installed to be adjacent to the clutch and including a piston, a bearing and a pressure plate to supply a hydraulic pressure to the clutch.

* * * * *